United States Patent

Critchfield et al.

[15] 3,689,531
[45] Sept. 5, 1972

[54] COPOLYMERS OF LACTONES AND ALKYLENE OXIDES

[72] Inventors: Frank Edward Critchfield, South Charleston, W. Va.; John Edward Hyre, Cincinnati, Ohio; Eldon Charles Stout, South Charleston, W. Va.

[73] Assignee: Union Carbide Corporation, New York, N.Y.

[22] Filed: April 1, 1969

[21] Appl. No.: 812,305

[52] U.S. Cl..............260/484 A, 252/351, 260/31.4, 260/410.6, 260/468 R, 260/473 A, 260/476 R
[51] Int. Cl..............................................C07c 69/66
[58] Field of Search..........................260/484 A, 468

[56] References Cited

UNITED STATES PATENTS

| | | |
|---|---|---|
| 2,535,832 | 12/1950 | Beears.................260/484 X |
| 2,573,701 | 11/1951 | Filachione.................260/484 |
| 2,608,578 | 8/1952 | Weesner....................260/484 |

FOREIGN PATENTS OR APPLICATIONS

| | | |
|---|---|---|
| 973,890 | 2/1951 | France......................260/482 |

*Primary Examiner*—Lorraine A. Weinberger
*Assistant Examiner*—Paul J. Killos
*Attorney*—Paul A. Rose, Louis C. Smith and Vincent P. Pirri

[57] ABSTRACT

This invention relates to the manufacture of novel polymeric products which result from the polymerization of an admixture containing lactones, alkylene oxides, and an organic monohydroxyl initiator, using potassium hydroxide as the catalyst therefor.

10 Claims, No Drawings

COPOLYMERS OF LACTONES AND ALKYLENE OXIDES

U.S. Pat. No. 2,962,524 discloses that an admixture of lactones, epoxides, and a polyfunctional initiator such as polyols, polyamines, polycarboxylic acids, etc., in the presence of a Lewis acid catalyst, e.g., borontrifluoride, can be polymerized to relatively low molecular weight oxyalkylene-carbooxyalkylene polymers. In the aforesaid polymerization process, the growth of the polymeric molecule is attributable to the attachment of linear lactone units and epoxide units at the functional sites of the initiator. The resulting polymeric products, obviously, are characterized by the polyfunctional initiator being chemically combined therein.

U.S. Pat. No. 3,312,753 discloses a process for preparing block copolymers of a caprolactone compound and an oxirane compound. In this process, the oxirane monomer is charged to a reaction vessel under an inert atmosphere and which contains an organometallic catalyst of Group II and III until substantial homopolymerization of the oxirane compound has occurred. Thereafter an epsilon-caprolactone monomer is charged to the reaction vessel and the polymerization reaction is continued until such caprolactone monomer has been substantially homopolymerized as a polymer block or polymer section to the resulting block copolymer.

It has now been discovered quite unexpectedly indeed, that novel lactone/alkylene oxide copolymers can be prepared by polymerizing an admixture containing lactone monomer, alkylene oxide monomer, and an organic monohydroxyl initiator, using potassium hydroxide as the catalyst therefor, to yield substantially block copolymeric products which have average molecular weights of upwards to about 4,000.

It should be noted at this time that the term "copolymer(s)," as employed herein including the appended claims, is used in its generic sense and thus embraces polymers formed from the polymerization of two or more polymerizable monomers.

The novel lactone/alkylene oxide copolymers, as indicated above, have average molecular weights upwards to about 4,000, desirably from about 300 to about 3,000. For various end-use applications such as plasticizers for polyvinyl chloride it is preferred that the average molecular weights of the novel copolymers range from about 600 to about 3,500. The novel copolymers are further characterized by recurring blocks of the structural units designated as I and II below, that is, blocks of Unit I having the formula

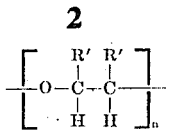

wherein each R, individually, is hydrogen, alkyl which preferably contains from one to eight carbon atoms, or alkoxy which preferably contains from one to eight carbon atoms; wherein $m$ is a number greater than 1; and wherein $x$ is an integer having a value of from 4 to 6 inclusive; with the proviso that no more than three R variables are substituents other than hydrogen; and blocks of Unit II having the formula:

II

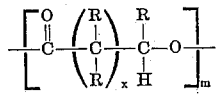

wherein each R', individually, is hydrogen, alkyl which preferably contains from one to four carbon atoms, alkoxy which preferably contains from one to four carbon atoms, or in which the two R' variables together with the ethylene moiety of the oxyethylene chain of Unit II above form a saturated or monoethylenically unsturated cycloaliphatic hydrocarbon ring preferably having from five to six carbon atoms; and wherein $n$ is a number greater than 1. It is preferred that recurring Unit II contains from two to 12 carbon atoms.

The novel copolymers consist essentially of the interconnection of polymeric blocks of Units I and II above wherein the proportion of these units can vary over the entire copolymer range, for example, from about 5 to about 95 weight percent of Unit I and from about 95 to about 5 weight percent of Unit II. Desirably the novel copolymers will contain a major amount, on a weight basis, of Unit I, and a minor amount, on a weight basis, of Unit II. Preferably the novel copolymers contain from about 65 to about 95 weight percent of Unit I and from about 35 to about 5 weight percent of Unit II.

The interconnection of the aforedescribed recurring blocks of linear Units I and II does not involve or result in the direct bonding of two carboxyl groups, i.e.,

or of two oxy groups, i.e., —O—O—, in the polymer chain or novel copolymers. In other words the terminal oxy group of a polymeric block comprising Unit I can be interconnected with the terminal carbon atom of a polymeric block comprising Unit II. In turn, the terminal oxy group of this latter polymeric block comprising Unit II can be interconnected with the terminal carbonyl group

of another polymeric block comprising Unit I. Thus, the polymer chain of the novel copolymer is characterized in that it contains alternating polymer blocks or sections comprising Units I and II.

The novel linear essentially block copolymers are also characterized by end groups which can be hydrogen (in the form of hydroxyl) at one end thereof and the radical $R_1(OR''')_aO-$ wherein $R_1$ is hydrocarbyl such as alkyl, cycloalkyl, aryl, alkaryl, aralkyl, and the like, preferably containing up to 18 carbon atoms, wherein $R'''$ is alkylene, preferably of two to four carbon atoms, and wherein $a$ is an integer having a value of from zero to 18, preferably from 0 to 2. One skilled in the art will readily appreciate that the hydroxyl end-group of the novel copolymers can be converted to alkoxy or acyloxy, e.g., alkanoyloxy, termination by well known techniques such as by esterification (reaction with a monocarboxylic acid or its corresponding anhydrides, e.g., alkanoic acid or anhydride such as acetic acid, acetic anhydride, butyric acid, butyric anhydride, 2-ethylhexanoic acid, stearic acid, benzoic acid, etc.) or by etherification (reaction with a monohydric compound, e.g., an alkanol such as methanol, n-propanol, 2-ethylhexanol, octadecanol, etc.)

Particularly preferred novel copolymers are those which are characterized by the oxypentamethylenecarbonyl chain and the oxyethylene chain. Such preferred copolymers are characterized by recurring blocks of structural Units III and IV below: III

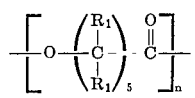

wherein each $R_1$, individually, is hydrogen or lower alkyl, preferably hydrogen or methyl, with the proviso that no more than three $R_1$ variables are substituents other than hydrogen; and

IV

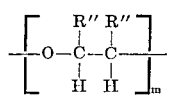

wherein each $R''$, individually, is hydrogen or lower alkyl, preferably hydrogen, methyl, and ethyl.

The novel copolymers can be prepared by polymerizing an admixture containing lactone monomer, alkylene oxide monomer, and an organic monohydroxyl initiator, using potassium hydroxide as the catalyst therefor.

The lactones which are contemplated as monomeric reactants in the practice of the process are best illustrated by the following formula: V

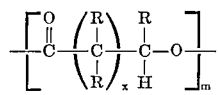

wherein each R, individually, is hydrogen, alkyl which preferably contains from one to eight carbon atoms, or alkoxy which preferably contains from one to eight carbon atoms; and wherein x is an integer having a value of from 4 to 6 inclusive; with the proviso that no more than three R variables are substituents other than hydrogen. Representative lactones include epsilon-caprolactone, zeta-enantholactone, eta-caprylolactone, methyl-epsilon-caprolactone, dimethyl-epsilon-caprolactone, ethyl-epsilon-caprolactone, isopropyl-epsilon-caprolactone, n-butyl-epsilon-caprolactone, dodecyl-epsilon-caprolactone, trimethyl-epsilon-caprolactone, methyl-zeta-enantholactone, methoxy-epsilon-caprolactone, dimethoxy-epsilon-caprolactone, ethoxy-epsilon-caprolactone, and the like. Epsilon-caprolactone and methyl-epsilon-caprolactone are preferred.

The alkylene oxides which can be employed as monomeric reactants are conveniently illustrated by Formula VI below:

VI 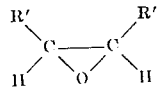

wherein each $R'$, individually, can be hydrogen, alkyl which preferably contains from one to four carbon atoms, alkoxy which preferably contains from one to four carbon atoms, or in which the two $R'$ variables together with both vicinal epoxy carbon atoms of Formula VI form a saturated or monoethylenically unsaturated cycloaliphatic hydrocarbon ring preferably having from five to six carbon atoms. It is preferred that the alkylene oxide monomers contain from two to 12 carbon atoms.

Among the alkylene oxides which deserve special mention include, for example, ethylene oxide, propylene oxide, the butylene oxides, 1,2-epoxydodecane, cyclopentene oxide, cyclohexene oxide, styrene oxide, and others. Ethylene oxide and propylene oxide are preferred because of their low cost.

The organic monohydroxyl initiators which are most desirable in the practice of the invention can be illustrated by the formula $R_1(OR''')_aOH$ wherein $R_1$ is hydrocarbyl such as alkyl, cycloalkyl, aryl, aralkyl, alkaryl, etc., preferably containing up to 18 carbon atoms, wherein $R'''$ is alkylene preferably containing from two to four carbon atoms, and wherein $a$ is an integer having a value of from zero to 18, preferably from 0 to 2. Illustrative initiators include the alkanols, e.g., methanol, ethanol, isopropanol, n-butanol, 2-ethylhexanol, dodecanol, and the like; the monoalkyl ethers of glycols and polyglycols, e.g., 2-ethoxyethanol, 2-propoxyethanol, 2-butoxy-ethanol, the monoethyl ethers of diethylene glycol, of triethylene glycol, of glycol, of tripropylene glycol; the monopropyl ethers of polyethylene glycol, of polypropylene glycol, of polybutylene glycol. The alkylene oxide adducts of substituted and unsubstituted phenols, e.g., the ethylene oxide and/or propylene oxide adducts of alkylphenols such as nonylphenol.

The potassium hydroxide catalyst is employed in catalytically significant quantities. In general, the nature of the monomeric reactants, the operative conditions under which the polymerization reaction is conducted, and other factors, will largely determine the optimum catalyst concentration. A catalyst concentration of from about 0.001 weight percent, and lower, to about 2 weight per cent, and higher, based on the monomer present in the reaction medium, is suitable. A catalyst concentration of from about 0.01 to about 1 weight percent is preferred.

The polymerization reaction is most desirably conducted at an elevated temperature range such as from about 75°C. to about 175°C. A more suitable temperature range is from about 85°C. to about 150°C.

The novel process is conducted for a period of time sufficient to produce the novel copolymeric product. In general, the reaction time will vary depending upon the operative temperature, the nature of the monomeric reactants, the choice of the inert organic vehicle, and other factors. The reaction time can vary from several minutes to several hours, e.g., up to approximately 24 hours, and more, depending on the variables illustrated above. Most desirably, the operative conditions are adjusted so as to achieve a practical and commercially acceptable reaction rate.

The polymerization reaction is effected in the liquid phase in an essentially non-aqueous reaction medium. It is desirable, also, to effect the polymerization reaction under an inert atmosphere, e.g., nitrogen. High purity reactants should be employed. Pressure does not appear to be a critical factor.

The novel process of this invention can be conducted via the bulk polymerization, suspension polymerization, or the solution polymerization routes The polymerization reaction can be carried out in the presence of an inert normally liquid organic vehickel, if desired.

The process of the invention can be executed in a batch, semi-continuous, or continuous fashion. The reaction vessel can be a glass vessel, steel autoclave, elongated metallic tube, or other equipment and material employed in the polymer art. In a continuous operation employing as the reaction zone an elongated tube or conduit, the use of one or a plurality of separate heat exchangers can be conveniently used. In a batch operation, stirring means can be provided for agitating the reaction mixture, as desired.

The proportions of the monomers can vary over the entire range. It is desirable, however, to employ a major amount, on a mole basis, of the lactone monomer, and a minor amount, on a mole basis, of the alkylene oxide monomer, based on the total mole of monomers. A molar excess of both the lactone monomer and alkylene oxide monomer with relation to the organic monohydroxyl initiator is employed. The amount of monomeric reactants employed will depend, in the main, on the desired molecular weight of the copolymeric product. For example, if one wishes to prepare n-butanol initiated copolymeric product having a molecular weight of about 1,650 and containing about 50 mole percent epsilon-caprolactone and about 50 mole percent ethylene oxide chemically combined therein, one would employ 10 moles of epsilon-caprolactone monomer, 10 moles of ethylene oxide monomer, and 1 mol of n-butanol initiator as the reaction mixture.

Unreacted monomeric reactants, if any, oftentimes can be recovered from the reaction product mixture by conventional techniques such as by heating said reaction product mixture under reduced pressure. Removal of unreacted monomeric reactants and/or inert organic vehicle can be accomplished by mechanical means such as treatment of the reaction product in a Marshall mill and the like. Catalyst residues may be removed by neutralization and subsequent filtration.

The novel copolymeric products which result from the practice of the novel process are, as indicated previously monohydroxyl-terminated linear lactone/alkylene block copolymers. The monohydroxyl end-group can be readily acylated (acid or anhydride) or etherified in a known manner.

The novel polymerization process is admirably suited to the preparation of novel linear block copolymers which can fit a wide variety of uses and fields of applications. As plasticizers, the novel copolymers impart desirable properties and characteristics to vinyl chloride resins. The incorporation of the novel copolymers into such vinyl chloride resins results in a plasticized composition which exhibits good flexibility at temperatures below 0°C. and good low brittle temperatures. By acylating or esterifying the monohydroxyl end-group of the novel copolymers, optimum plasticization can be achieved since the water extractability characteristic is thus markedly reduced. The novel substantially linear block copolymers can also be used as functional fluids, surfactants, an emulsifying agents.

The following examples are illustrative.

EXAMPLES 1-8

The potassium hydroxide catalyst was dissolved in the monohydroxyl initiator under a nitrogen atmosphere at a temperature of 100°C. in a stainless steel autoclave equipped with automatic temperature and pressure controls and a circulating pump. After heating to 110°-114°C. the lactone and alkylene oxide mixture was added at a rate to hold the reactor pressure at 50 psig. A total time of 12 hours was required to add the lactone/alkylene oxide mixture. At the end of this period the reaction was continued until the reactor pressure drop was less than one psig./hour.

The reaction mixture was then neutralized with an equivalent amount of hydrochloric acid and unreacted monomers were removed under reduced pressure. The neutralized reaction product mixture was then filtered. The pertinent data are set out in Table I below.

TABLE I

| Example number | Initiator | Lactone | Weight, percent | Alkylene oxide | Weight, percent | Molecular weight | Acid number |
|---|---|---|---|---|---|---|---|
| 1 | 2-ethylhexanol | ε-Caprolactone | 50 | Ethylene oxide | 50 | 920 | 1.40 |
| 2 | do | ε-Methyl-ε-caprolactone | 75 | do | 25 | 2,050 | 2.15 |
| 3 | do | ε-Caprolactone | 80 | Propylene oxide | 20 | 2,750 | 1.55 |
| 4 | do | do | 80 | do | 20 | 2,445 | 1.70 |
| 5 | n-Butanol | do | 75 | Ethylene oxide | 25 | 1,550 | 0.75 |
| 6 | do | δ-Valerolactone | 60 | 1,2-butylene oxide | 40 | 1,045 | 2.20 |
| 7 | 2-ethoxyethanol | zeta-Enantholactone | 50 | Ethylene oxide | 50 | 1,330 | 1.95 |
| 8 | n-Butanol | ε-Caprolactone | 75 | Cyclohexene oxide | 25 | 1,120 | 1.20 |

EXAMPLE 9

The copolymer from Example 1 was acylated with a 50 mole percent excess of acetic anhydride for 3 to 4 hours at 125°C. Excess acetic anhydride and acetic acid was then removed under reduced pressure. The resulting acylated alkylene oxide/lactone copolymeric product was a viscous liquid having a molecular weight of about 900, as determined by conventional ebullioscopic techniques.

EXAMPLE 10

The copolymer from Example 2 was acylated with a 50 mole per cent excess of isobutyric anhydride for 3 to 4 hours at 125°C. Excess isobutyric anhydride and isobutyric acid was then removed under reduced pressure. The resulting acylated alkylene oxide/lactone copolymeric product was a viscous liquid having a molecular weight of about 2,100, as determined by conventional ebullioscopic techniques

EXAMPLE 11

The copolymer from Example 3 was acylated with a 50 mole per cent excess of acetic anhydride for 3 to 4 hours at 125°C. Excess acetic anhydride and acetic acid was then removed under reduced pressure. The resulting acylated alkylene oxide/lactone copolymeric product had a molecular weight of about 2,850, as determined by conventional ebullioscopic techniques.

EXAMPLE 12

The copolymer from Example 4 was acylated with a 50 mole percent excess of 2-ethylhexanoic anhydride for 3 to 4 hours at 125°C. Excess 2-ethylhexanoic anhydride and 2-ethyl-hexanoic acid was then removed under reduced pressure. The resulting acylated alkylene oxide/lactone copolymeric product had a molecular weight of about 2,400, as determined by conventional ebullioscopic techniques.

EXAMPLE 13

The copolymer from Example 5 was acylated with a 50 mole per cent excess of isobutyric anhydride for 3 to 4 hours at 125°C. Excess isobutyric anhydride and isobutyric acid was then removed under reduced pressure. The resulting acylated alkylene oxide/lactone copolymeric product was a viscous liquid having a molecular weight of about 1,700, as determined by conventional ebullioscopic techniques.

EXAMPLE 14

The copolymer from Example 6 was acylated with a 50 mole per cent excess of acetic anhydride for 3 to 4 hours at 125°C. Excess acetic anhydride and acetic acid was then removed under reduced pressure. The resulting acylated alkylene oxide/lactone copolymeric product was a viscous liquid having a molecular weight of about 950, as determined by conventional ebullioscopic techniques.

EXAMPLE 15

The copolymer from Example 7 was acylated with a 50 mole percent excess of 2-ethylhexanoic anhydride for 3 to 4 hours at 125°C. Excess 2-ethylhexanoic anhydride and 2-ethyl-hexanoic acid was then removed under reduced pressure. The resulting acylated alkylene oxide/lactone copolymeric product had a molecular weight of about 1,400, as determined by conventional ebullioscopic techniques.

EXAMPLE 16

The copolymer from Example 8 was acylated with a 50 mole percent excess of acetic anhydride for 3 to 4 hours at 125°C. Excess acetic anhydride and acetic acid was then removed under reduced pressure. The resulting acylated alkylene oxide/lactone copolymeric product had a molecular weight of about 1,200, as determined by conventional ebullioscopic techniques.

What is claimed is:

1. Essentially linear copolymers having molecular weights of from about 300 upwards to about 4,000 and which are characterized by recurring blocks of structural Units I and II below, that is, Unit I having the formula:

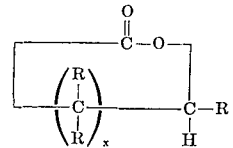

wherein each R, individually, is hydrogen or alkyl or alkoxy having from one to eight carbon atoms; $m$ is a number greater than one; and $x$ is an integer having a value of from 4 to 6 inclusive, with the proviso that no more than three R variables are substituents other than hydrogen; and Unit II having the formula:

II

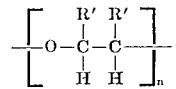

wherein each R′, individually, is hydrogen or alkyl or alkoxy having from one to four carbon atoms, or in which the two R′ variables together with the ethylene moiety of the oxyethylene chain of Unit II above form a saturated or monoethylenically unsaturated cycloaliphatic hydrocarbon ring having from five to six carbon atoms; and wherein n is a number greater than one; the terminal moieties of said linear copolymers being hydroxylic hydrogen, alkyl, or the acyl group of a monocarboxylic acid at one end thereof, and the radical $R_1(OR''')_aO-$ at the other end thereof in which $R_1$ is hydrocarbyl containing up to 18 carbon atoms, $R'''$ is alkylene of from 2 to 4 carbon atoms, and a is an integer having a value of zero to 18, wherein the terminal —O— group of Unit I connects to the terminal carbon atom of Unit II and the terminal —O— group of Unit II connects to the terminal —CO— group of Unit I.

2. The linear copolymers of claim 1 wherein Unit I is

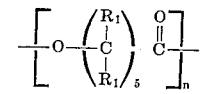

wherein each $R_1$, individually, is hydrogen or lower alkyl, with the proviso that no more than three $R_1$ variables are substituents other than hydrogen; and wherein Unit II is

IV

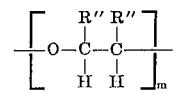

wherein each R″, individually, is hydrogen or lower alkyl; said linear copolymers containing a major amount, on a weight basis, of Unit III above, and a minor amount, on a weight basis, of Unit IV above.

3. The linear copolymers of claim 2 wherein each $R_1$ variable of Unit III is hydrogen or methyl.

4. The linear copolymers of claim 2 wherein the $R_1$ variables of Unit III are hydrogen.

5. The linear copolymers of claim 2 wherein said copolymers contain from about 65 to about 95 95 weight percent of Unit III and from about 35 to about 5 weight percent of Unit IV.

6. The linear copolymers of claim 3 wherein the radical $R_1(OR''')_aO-$ is alkoxy.

7. A process for producing linear, essentially block copolymers of lactones and alkylene oxides having molecular weights of from about 300 upwards to about 4,000 which comprises contacting:

a. a lactone of the formula:

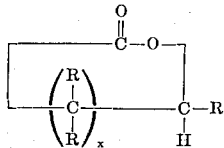

wherein each R, individually, is hydrogen or alkyl or alkoxy having from one to eight carbon atoms; and $x$ is an integer having a value of from 4 to 6 inclusive; with the proviso that no more than three R variables are substituents other than hydrogen;

b. an alkylene oxide of the formula:

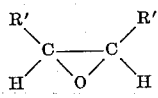

wherein each R', individually, is hydrogen or alkyl or alkoxy having from one to four carbon atoms, or in which the two R' variables together with both vicinal epoxy carbon atoms of the above shown formula form a saturated or monoethylenically unsaturated cycloaliphatic hydrocarbon ring having from five to six carbon atoms; and c. an organic monofunctional hydroxyl initiator of the formula $R_1(OR''')_aOH$ wherein $R_1$ is hydrocarbyl having up to 18 carbon atoms; $R'''$ is alkylene having from two to four carbon atoms and a is an integer having a value of zero to 18;

d. using a molar excess of both of said lactone and said alkylene oxide reactants with relation to said organic monofunctional initiator;

e. at an elevated temperature and under essentially anhydrous conditions; and f. for a period of time sufficient to produce said linear, essentially block copolymers.

8. The process of claim 7 wherein said lactone is an epsilon-caprolactone and wherein said alkylene oxide contains from two to four carbon atoms.

9. The process of claim 8 wherein said alkylene oxide is ethylene oxide.

10. The process of claim 8 wherein said alkylene oxide is propylene oxide.

* * * * *

UNITED STATES PATENT OFFICE
CERTIFICATE OF CORRECTION

Patent No. 3,689,531　　　　Dated September 5, 1972

Inventor(s) F. E. Critchfield et al

It is certified that error appears in the above-identified patent and that said Letters Patent are hereby corrected as shown below:

Column 3, lines 37 to 43, delete the formula and replace it by the formula:

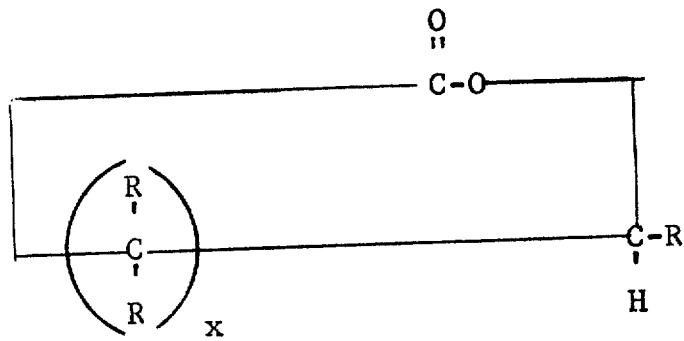

Claim 1, column 8, lines 7 to 11, delete the formula and replace by the formula:

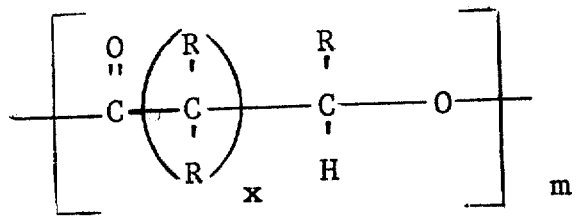

Signed and sealed this 23rd day of January 1973.

(SEAL)
Attest:

EDWARD M. FLETCHER, JR.
Attesting Officer

ROBERT GOTTSCHALK
Commissioner of Patents